United States Patent
Toda (10) Patent No.: US 6,690,261 B2
(45) Date of Patent: Feb. 10, 2004

(54) ULTRASONIC RECOGNITION SYSTEM ON DIGITAL COMMUNICATION

(76) Inventor: Kohji Toda, 1-49-18 Futaba, Yokosuka (JP), 239-0814

( * ) Notice: Subject to any disclaimer, the term of this patent is extended or adjusted under 35 U.S.C. 154(b) by 491 days.

(21) Appl. No.: 09/747,412

(22) Filed: Dec. 19, 2000

(65) Prior Publication Data

US 2002/0075132 A1 Jun. 20, 2002

(51) Int. Cl.$^7$ .......................... G05B 19/00; G05B 23/00
(52) U.S. Cl. ...................... 340/5.8; 340/5.61; 340/5.74; 340/5.65; 382/116
(58) Field of Search ................................. 340/5.8, 5.61, 340/5.6, 5.65, 5.74; 382/116; 713/184, 185, 200, 201, 202; 235/380, 492; 310/334

(56) References Cited

U.S. PATENT DOCUMENTS 4,729,128 A * 3/1988 Grimes et al. ................. 382/58
6,330,978 B1 * 12/2001 Molano et al. ............. 235/492

* cited by examiner

Primary Examiner—Michael Horabik
Assistant Examiner—Vernal Brown (57) ABSTRACT

An ultrasonic recognition system on digital communication comprises an identification card, a detail communication device attached to a detail computer, and a master communication device attached to a master computer. The identification card consists of a first piezoelectric substrate, an individual coded IDT, and a first intermediary IDT. The detail communication device consists of a second piezoelectric substrate and transmitting- and receiving sections. The transmitting section is composed of a bipolar-pulse generator, a first coded IDT, a second coded IDT, a second intermediary IDT, an electrode group, a synchronizing device, an envelope detecting device, and a monopolar-pulse generator. The receiving section is composed of a third intermediary IDT, a third coded IDT, a fourth coded IDT, and a detecting device. If the identification card is set in the detail communication device, a pulse is generated at the bipolar-pulse generator at regular intervals. When the pulse is applied to the individual coded IDT, an individual SAW is excited on the first piezoelectric substrate. The individual SAW is detected at the first intermediary IDT as an individual coded burst-signal, which is received at the electrode group and is converted into an individual coded digital-signal at the monopolar-pulse generator. The individual coded digital-signal is delivered into a digital network. When the individual coded digital-signal is received by the master communication device, the signal decoding is achieved, so that the identification-card singularity is recognized by the master communication device.

8 Claims, 6 Drawing Sheets

ULTRASONIC RECOGNITION SYSTEM ON DIGITAL COMMUNICATION

BACKGROUND OF THE INVENTION

1. Field of the Invention

The present invention relates to an ultrasonic recognition system on digital network communication between a master station and detail stations by means of using a master communication device attached to the master station, detail communication devices attached to the detail stations, respectively, and identification cards set in the detail communication devices, respectively.

2. Description of the Prior Art

It is most important on digital network communication to prevent the influence of noises and invaders. However, it is difficult to keep the communication secret by the coding technique based on conventional hard-wears such as magnetic cards and IC cards. The magnetic cards are very convenient and popular, however it is easy to make copies thereof or steal passwords. Therefore damages by unlawful using of credit cards, cash cards, prepaid cards, and so on are increasing year after year. The IC cards are superior to the magnetic cards in difficulty in counterfeiting of cards, however it is not enough to keep the communication secret thoroughly. Thus, conventional hard-wears have problems on keeping a communication security.

SUMMARY OF THE INVENTION

An object of the present invention is to provide an identification card useful as credit card, cash card, key, and others.

Another object of the present invention is to provide an identification card excellent in difficulty in counterfeiting and stealing of passwords.

Another object of the present invention is to provide an ultrasonic recognition system on digital communication capable of recognizing the identification-card singularity in secret.

Another object of the present invention is to provide an ultrasonic recognition system on digital communication capable of low electric power consumption.

Another object of the present invention is to provide an ultrasonic recognition system on digital communication excellent in durability and manufacturing.

A still other object of the present invention is to provide an ultrasonic recognition system on digital communication having a small size and a simple structure.

According to one aspect of the present invention there is provided an ultrasonic recognition system on digital communication comprising a master communication device attached to a master computer, a detail communication device attached to a detail computer, and an identification card set in the detail communication device. If the identification card delivers an individual coded digital-signal via the detail communication device into a digital network, the master communication device recognizes the identification-card singularity when receiving the individual coded digital-signal through the digital network. Thus, the master communication device keeps on communicating with the detail communication device while the identification card is set in the detail communication device. In addition, for further securing such a communication system, a coded request digital-signal asking for password is delivered from the master communication device into the digital network toward the detail communication device before the communication between the master communication device and the detail communication device arises.

According to another aspect of the present invention there is provided an ultrasonic recognition system on digital communication comprising an identification card, a detail communication device, and a master communication device. The identification card consists of a first piezoelectric substrate, an individual coded interdigital transducer (IDT) having an individual coded pattern, and a first intermediary IDT. The detail communication device consists of a second piezoelectric substrate, and transmitting- and receiving sections. The transmitting section is composed of a bipolar-pulse generator, first- and second coded IDTs having first- and second coded patterns, respectively, a second intermediary IDT, first- and second side IDTs, a central IDT between the first- and second side IDTs, a synchronizing device connected between the second intermediary IDT and the first side IDT, an envelope detecting device connected with the central IDT, and a monopolar-pulse generator. The first- and second side IDTs and the central IDT form an electrode group. The master communication device has the same construction as the detail communication device, and consists of a third piezoelectric substrate and transmitting- and receiving sections. The receiving section is composed of a third intermediary IDT, third- and fourth coded IDTs having third- and fourth coded patterns, respectively.

If the identification card is set in the detail communication device, a pulse is generated at the bipolar-pulse generator, and is applied to individual coded IDT. In this time, an individual SAW corresponding to the individual coded pattern is excited on the first piezoelectric substrate, and is detected at the first intermediary IDT as an individual coded burst-signal. When the individual coded burst-signal arrives at the first- and second side IDTs, respectively, first- and second SAWs are excited on the second piezoelectric substrate, respectively. The first- and second SAWs arrive at the central IDT simultaneously. And then, an individual coded digital-signal is obtained at the monopolar-pulse generator via the envelope detecting device, and is delivered into a digital network. On the other hand, if the individual coded digital-signal arrives at the master communication device, it is received at the third intermediary IDT. In this time, a third SAW composed of an individual coded row of burst-wave groups is excited on the third piezoelectric substrate. When the burst-wave group correlates to the third- and fourth coded patterns, respectively, first- and second decoded pulses are detected at the third- and fourth coded IDTs, respectively. As a result, an output digital-signal equivalent to the individual coded pattern, is detected at the detecting device. Therefore, the identification-card singularity is recognized from the output digital-signal.

In addition, for further securing such a communication system, a coded request digital-signal asking for password is delivered from the transmitting section of the master communication device into the digital network toward the detail communication device just after recognition of the identification-card singularity. The coded request digital-signal asking for password is received at the receiving section of the detail communication device through the digital network. And then, a coded password digital-signal is delivered from the transmitting section of the detail communication device into the digital network. When the coded password digital-signal is received at the receiving section of the master communication device through the digital network, it is converted into an output digital-signal equivalent to the password digital-signal. Thus, the communication between the master communication device and the detail communication device starts.

According to another aspect of the present invention there are provided first-, second-, third-, and fourth coded IDTs consisting of at least three interdigital electrode pairs, respectively.

According to another aspect of the present invention there are provided third- and fourth coded IDTs having third- and fourth coded patterns in reverse to the first- and second coded patterns, respectively.

According to another aspect of the present invention there is provided an individual coded IDT constructed of multiple times four coded IDTs classified into at most two types that correspond to the first- and second coded IDTs, respectively.

According to another aspect of the present invention there is provided a bipolar-pulse generator in place of the monopolar-pulse generator.

According to other aspect of the present invention there is provided an individual coded IDT comprising at least two parts that are electrically separated and in uneven parallel with each other. The parts excite individual SAWs, respectively, on the first piezoelectric substrate when receiving the pulse from the bipolar-pulse generator simultaneously. The first intermediary IDT receives the individual SAWs one by one, and detects a mixed individual coded burst-signal corresponding to the individual coded pattern.

According to a further aspect of the present invention there are provided an individual coded IDT comprising first- and second parts that are electrically separated and vertical from each other, and an identification card further comprising a fourth intermediary IDT. The first- and second parts excite first- and second individual SAWs, respectively, on the first piezoelectric substrate when receiving the pulse from the bipolar-pulse generator simultaneously. The fourth intermediary IDT detects a first individual coded burst-signal corresponding to the first individual SAW. The first intermediary IDT detects a second individual coded burst-signal corresponding to the second individual SAW just after the fourth intermediary IDT detects the first individual coded burst-signal. The first- and second individual coded burst-signals form a mixed individual coded burst-signal corresponding to the individual coded pattern.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
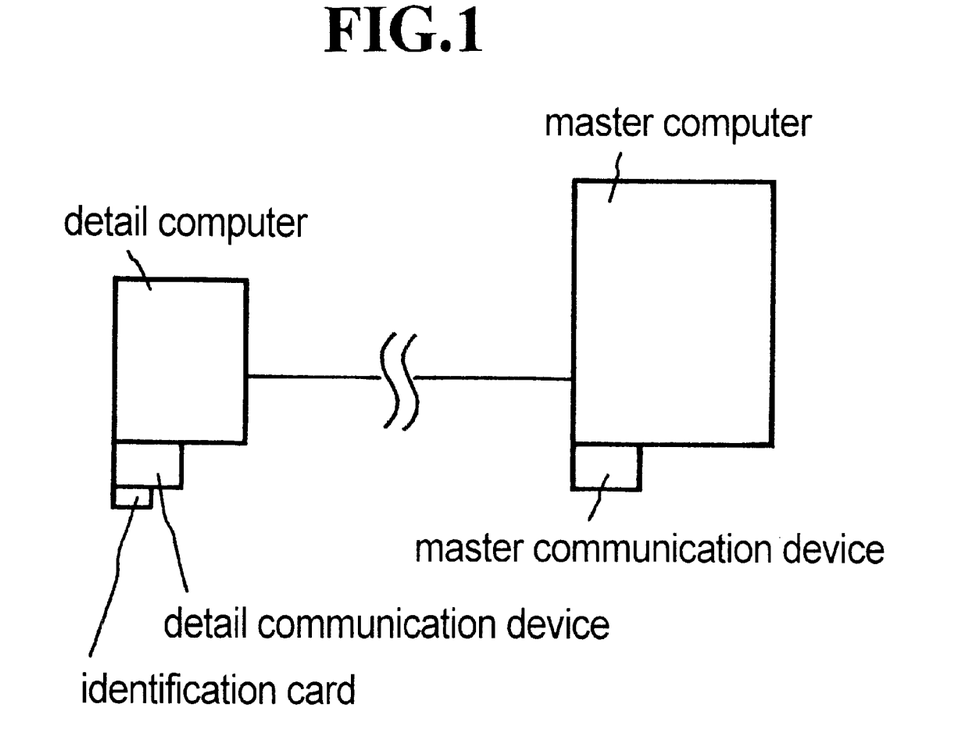
FIG. 1 shows a schematic illustration of an ultrasonic recognition system on digital communication according to an embodiment of the present invention.

FIG. 1 shows a schematic illustration of an ultrasonic recognition system on digital communication according to an embodiment of the present invention. The ultrasonic recognition system on digital communication comprises an identification card, a detail communication device attached to a detail computer, and a master communication device attached to a master computer. If the identification card is set in the detail communication device, an individual coded digital-signal is delivered from the identification card at regular intervals into a digital network. When the individual coded digital-signal is received at the master communication device, the identification-card singularity is recognized by the master communication device. Thus, the master communication device keeps on communicating with the detail communication device while the identification card is set in the detail communication device. In addition, in case of necessity, the master communication device asks the detail communication device to send a coded password digital-signal before the communication between the master communication device and the detail communication device starts.

Figure 2:
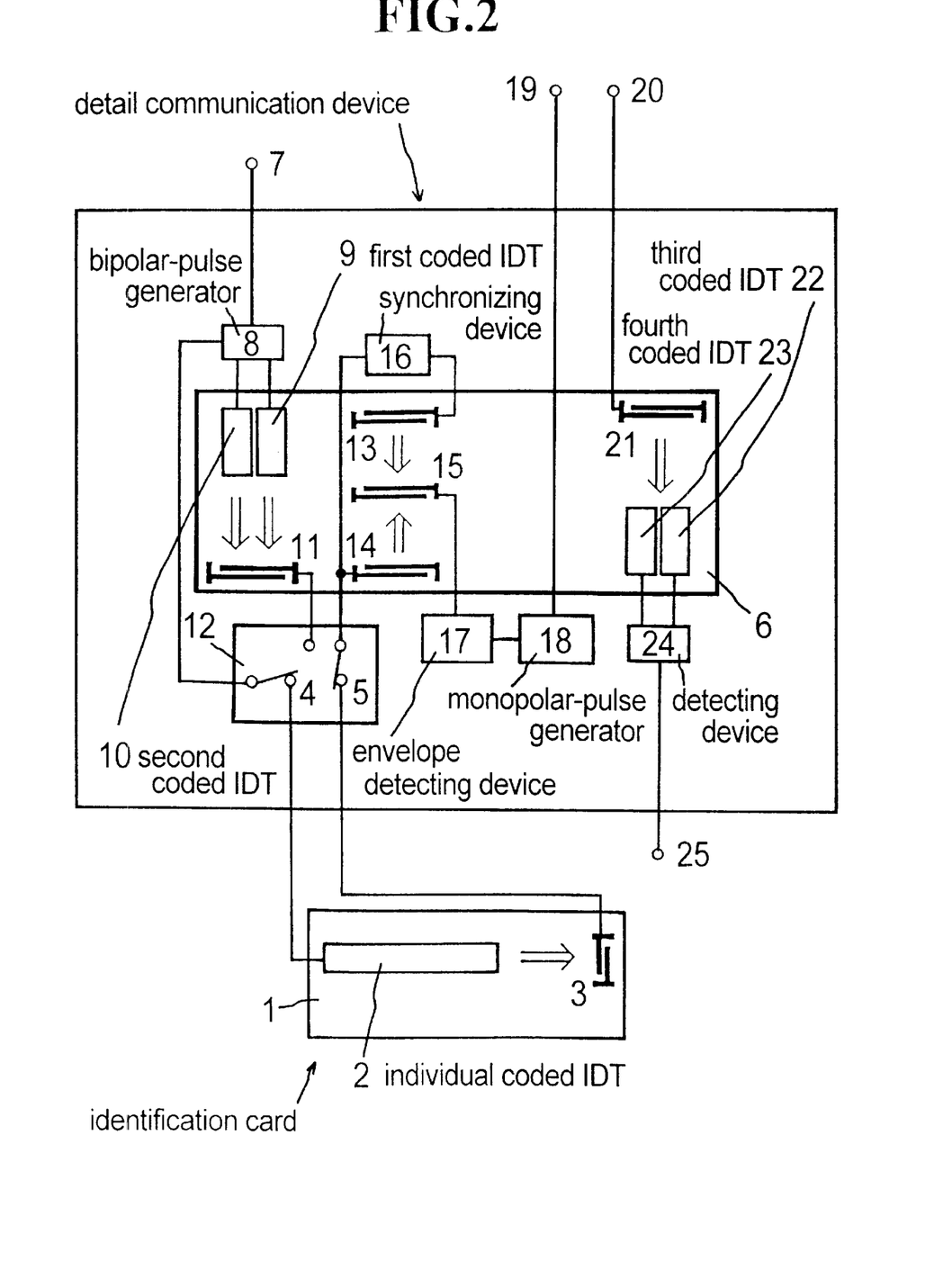
FIG. 2 shows a schematic illustration of the detail communication device with the identification card according to an embodiment.

FIG. 2 shows a schematic illustration of the detail communication device with the identification card according to an embodiment. The identification card comprises first piezoelectric substrate 1, individual coded IDT 2, first intermediary IDT 3, electrode terminal 4, and electrode terminal 5. Individual coded IDT 2 and first intermediary IDT 3, made of an aluminum thin film, respectively, are formed on first piezoelectric substrate 1 made of a piezoelectric ceramic thin plate with a dimension of 200 $\mu$m in thickness. It is possible to use $LiNbO_3$ and so on in place of the piezoelectric ceramic plate. The detail communication device comprises second piezoelectric substrate 6 and transmitting- and receiving sections. The transmitting section consists of electrode terminal 7, bipolar-pulse generator 8, first coded IDT 9, second coded IDT 10, second intermediary IDT 11, setting switch 12, first side IDT 13, second side IDT 14, central IDT 15, synchronizing device 16, envelope detecting device 17, monopolar-pulse generator 18, and electrode terminal 19. First side IDT 13, second side IDT 14, and central IDT 15 between first side IDT 13 and second side IDT 14, form an electrode group. Synchronizing device 16 is connected between second intermediary IDT 11 and first side IDT 13. Envelope detecting device 17 is connected with central IDT 15. The receiving section consists of electrode terminal 20, third intermediary IDT 21, third coded IDT 22, fourth coded IDT 23, detecting device 24, and electrode terminal 25. First coded IDT 9, second coded IDT 10, second intermediary IDT 11, first side IDT 13, second side IDT 14, central IDT 15, third intermediary IDT 21, third coded IDT 22, and fourth coded IDT 23, made of an aluminum thin film, respectively, are formed on second piezoelectric substrate 6 made of a piezoelectric ceramic thin plate with a dimension of 200 $\mu$m in thickness. It is possible to use $LiNbO_3$ and so on in place of the piezoelectric ceramic plate. First intermediary IDT 3, second intermediary IDT 11, first side IDT 13, second side IDT 14, central IDT 15, and third intermediary IDT 21 have an interdigital periodicity of 40 $\mu$m, respectively.

Figure 3:
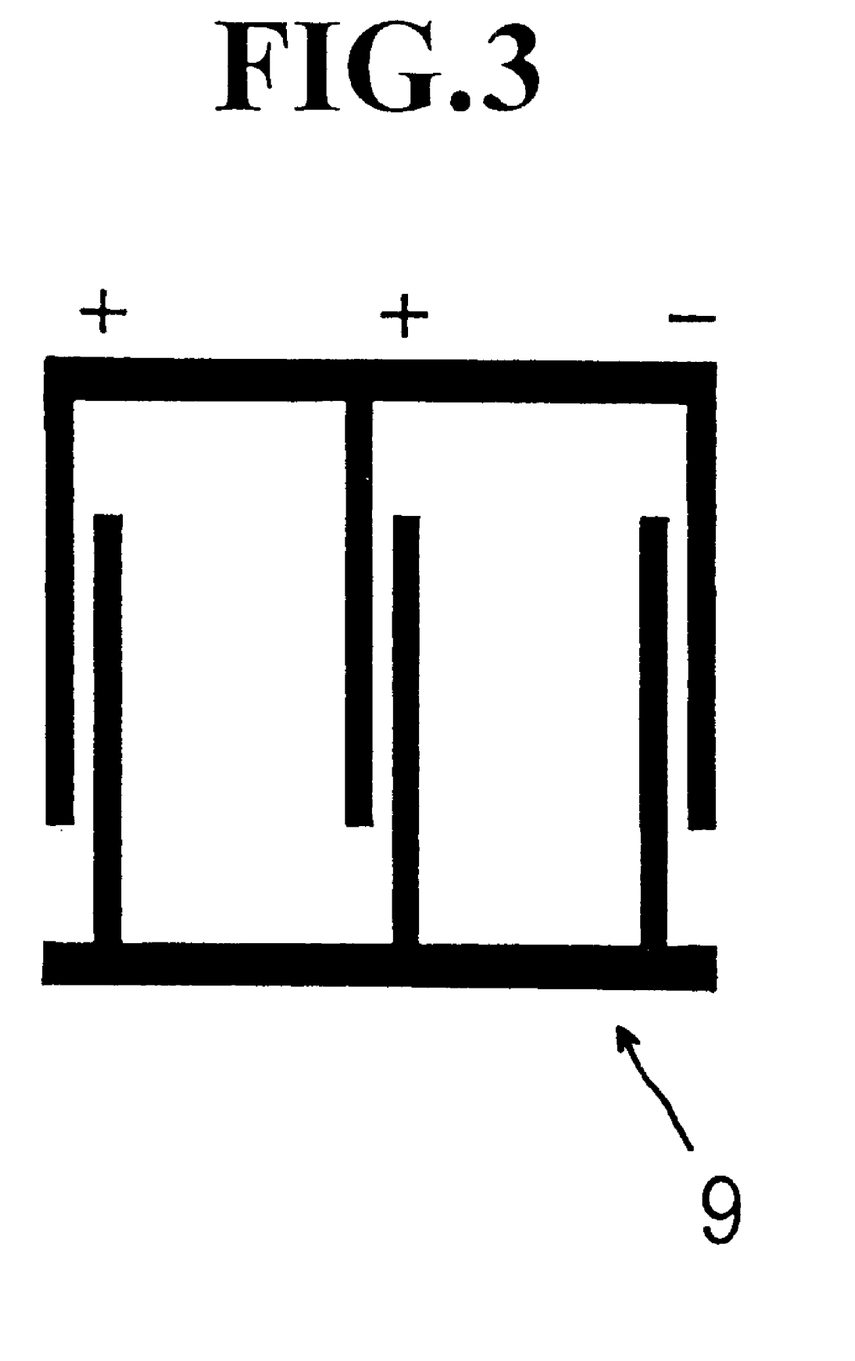
FIG. 3 shows a plan view of first coded IDT 9.

FIG. 3 shows a plan view of first coded IDT 9 consisting of three interdigital electrode pairs. Each pair has an interdigital periodicity of 40 $\mu$m. First coded IDT 9 has a first coded pattern based on the Baker code. Second coded IDT 10 also consists of three interdigital electrode pairs, and has a second coded pattern. Third coded IDT 22 has a third coded pattern in reverse to the first coded pattern. Fourth coded IDT 23 has a fourth coded pattern in reverse to the second coded pattern. Besides a three-digits code (1, 1, 0) as shown in FIG. 3, for example, a seven-digits code (1, 1, 1, 0, 0, 1, 0), an eleven-digits code (1, 1, 1, 0, 0, 0, 1, 0, 0, 1, 0), and others are available.

Figure 4:
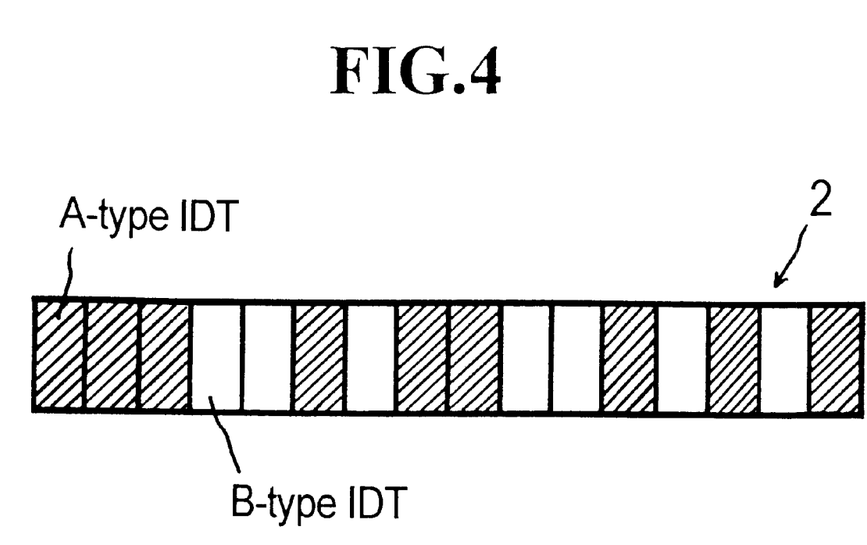
FIG. 4 shows a schematic illustration of individual coded IDT 2.

FIG. 4 shows a schematic illustration of individual coded IDT 2. Individual coded IDT 2 is constructed of 16 coded IDTs classified into A- and B types, which correspond to first coded IDT 9 and second coded IDT 10, respectively. In short, individual coded IDT 2 has a mixed construction of nine A-type IDTs and seven B-type IDTs. In other words, individual coded IDT 2 consists of 48 interdigital electrode pairs classified into 16 electrode-pair groups, and has an individual coded pattern.

The master communication device corresponding with the detail communication device in FIG. 2 has the same construction as the detail communication device in FIG. 2, except for absence of setting switch 12. Thus, the master communication device comprises third piezoelectric substrate 6M, electrode terminal 7M, bipolar-pulse generator 8M, first coded IDT 9M, second coded IDT 10M, second intermediary IDT 11M, first side IDT 13M, second side IDT 14M directly connected with second intermediary IDT 11M, central IDT 15M, synchronizing device 16M, envelope detecting device 17M, monopolar-pulse generator 18M, electrode terminal 19M, electrode terminal 20M, third intermediary IDT 21M, third coded IDT 22M, fourth coded IDT 23M, detecting device 24M, and electrode terminal 25M. Thus, the ultrasonic recognition system on digital communication has a simple structure with s small size.

In the ultrasonic recognition system on digital communication composed of the identification card and the detail communication device in FIG. 2 and the corresponding master communication device, if the identification card is set in the detail communication device, electrode terminal 4 and electrode terminal 5 are connected at regular intervals with bipolar-pulse generator 8 and second side IDT 14, respectively, via setting switch 12. In this time, a pulse is generated at bipolar-pulse generator 8. When the pulse is applied to individual coded IDT 2, an individual SAW corresponding to the individual coded pattern is excited on first piezoelectric substrate 1. The individual SAW is detected at first intermediary IDT 3 as an individual coded burst-signal. When the individual coded burst-signal arrives at first side IDT 13 and second side IDT 14, first- and second SAWs are excited on second piezoelectric substrate 6. The first SAW takes a form of burst signal with the same phase state via synchronizing device 16. The first- and second SAWs arrive at central IDT 15 simultaneously. And then, an individual coded digital-signal, that is, an individual coded row of 48 monopolar digital-pulses, is obtained at monopolar-pulse generator 18 via envelope detecting device 17. Thus, the individual coded digital-signal is delivered into a digital network via electrode terminal 19. Moreover, because of the use of monopolar-pulse generator 18, a monopolar-type transmission is realized. However, the use of a bipolar-pulse generator in place of monopolar-pulse generator 18 enables a bipolar-type transmission superior in transmission ability to the monopolar-type transmission.

On the other hand, if the individual coded digital-signal arrives at the corresponding master communication device, it is received at third intermediary IDT 21M via electrode terminal 20M. In this time, a third SAW composed of an individual coded row of 48 burst-waves, which are classified into 16 burst-wave groups, is excited on third piezoelectric substrate 6M. When the burst-wave group correlates to the third coded pattern, a first decoded pulse is detected at third coded IDT 22M. In the same way, the burst-wave group correlates to the fourth coded pattern, a second decoded pulse is detected at fourth coded IDT 23M. Thus, both third coded IDT 22M and fourth coded IDT 23M have an ability as a SAW matched filter. As a result, an output digital-signal, which is composed of nine first decoded pulses and seven second decoded pulses and is equivalent to the individual coded pattern, is detected at electrode terminal 25M via detecting device 24M without the influence of noises. Therefore, the identification-card singularity is recognized from the output digital-signal. Thus, the master communication device keeps on communicating with the detail communication device while the identification card is set in the detail communication device.

In addition, for further securing such a communication system, a coded request digital-signal asking for password is delivered from electrode terminal 19M into the digital network toward the detail communication device just after recognition of the identification-card singularity. For the first time, a request digital-signal is applied to bipolar-pulse generator 8M via electrode terminal 7M, and bipolar pulses (−1 and 1) are generated at bipolar-pulse generator 8M. When the bipolar pulses (−1 and 1) are applied to first coded IDT 9M and second coded IDT 10M, respectively, fourth- and fifth SAWs corresponding to the first- and second coded patterns, respectively, are excited on third piezoelectric substrate 6M. The fourth- and fifth SAWs are detected at second intermediary IDT 11M as first- and second coded burst-signals, respectively. When the first coded burst-signal arrives at first side IDT 13M and second side IDT 14M, the first- and second SAWs are excited on third piezoelectric substrate 6M. The first- and second SAWs arrive at central IDT 15M simultaneously. And then, a first coded digital-signal, that is, a first coded row of three monopolar digital-pulses, is obtained at monopolar-pulse generator 18M via envelope detecting device 17M. In the same way, the second coded burst-signal is converted into a second coded digital-signal. The first- and second coded digital-signals form the coded request digital-signal, which is delivered into the digital network via electrode terminal 19M.

If the coded request digital-signal is received at electrode terminal 20 through the digital network, it is applied to third intermediary IDT 21. When the first coded digital-signal of the coded request digital-signal is applied to third intermediary IDT 21, a third SAW composed of a first coded row of three burst-waves is excited on second piezoelectric substrate 6. When the first coded row of three burst-waves correlates to the third coded pattern, a first decoded pulse is detected at third coded IDT 22. In the same way, when the second coded digital-signal is applied to third intermediary IDT 21, a third SAW composed of a second coded row of three burst-waves is excited on second piezoelectric substrate 6. When the second coded row of three burst-waves correlates to the fourth coded pattern, a second decoded pulse is detected at fourth coded IDT 23. Thus, an output digital-signal, which is composed of the first- and second decoded pulses and is equivalent to the request digital-signal, is detected at detecting terminal 25 via detecting device 24 without the influence of noises. In this time, a password digital-signal is applied to bipolar-pulse generator 8 via electrode terminal 7. The password digital-signal is converted into a coded password digital-signal at monopolar-pulse generator 18, and is delivered into the digital network via electrode terminal 19. If the coded password digital-signal is received at electrode terminal 20M through the digital network, it is converted into an output digital-signal equivalent to the password digital-signal, and is detected at detecting terminal 25M via detecting device 24M without the influence of noises.

Figure 5:
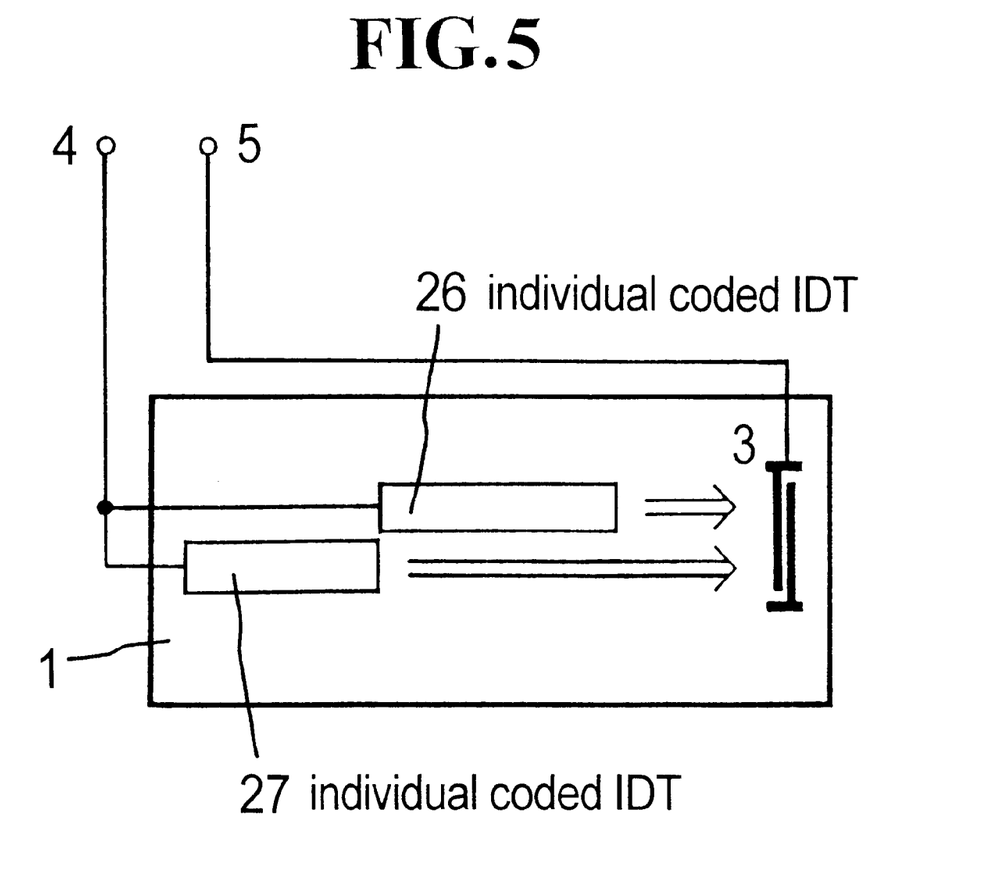
FIG. 5 shows a schematic illustration of another identification card in place of the identification card in FIG. 2.

FIG. 5 shows a schematic illustration of another identification card in place of the identification card in FIG. 2. The identification card in FIG. 5 has the same construction as FIG. 2 except for individual coded IDT 26 and individual coded IDT 27, which are in place of individual coded IDT 2. Individual coded IDT 26 and individual coded IDT 27 are in uneven parallel with each other, and located such that the distance between individual coded IDT 26 and first intermediary IDT 3 is shorter than that between individual coded IDT 27 and first intermediary IDT 3. If the pulse generated at bipolar-pulse generator 8 is applied to individual coded IDT 26 and individual coded IDT 27, respectively, first- and second individual SAWs, respectively, are excited on first piezoelectric substrate 1. The first individual SAW is detected at first intermediary IDT 3 as a first individual coded burst-signal, and continuously the second individual SAW is detected at first intermediary IDT 3 as a second individual coded burst-signal. The first- and second individual coded burst-signals form a mixed individual coded burst-signal corresponding to the individual coded pattern.

Figure 6:
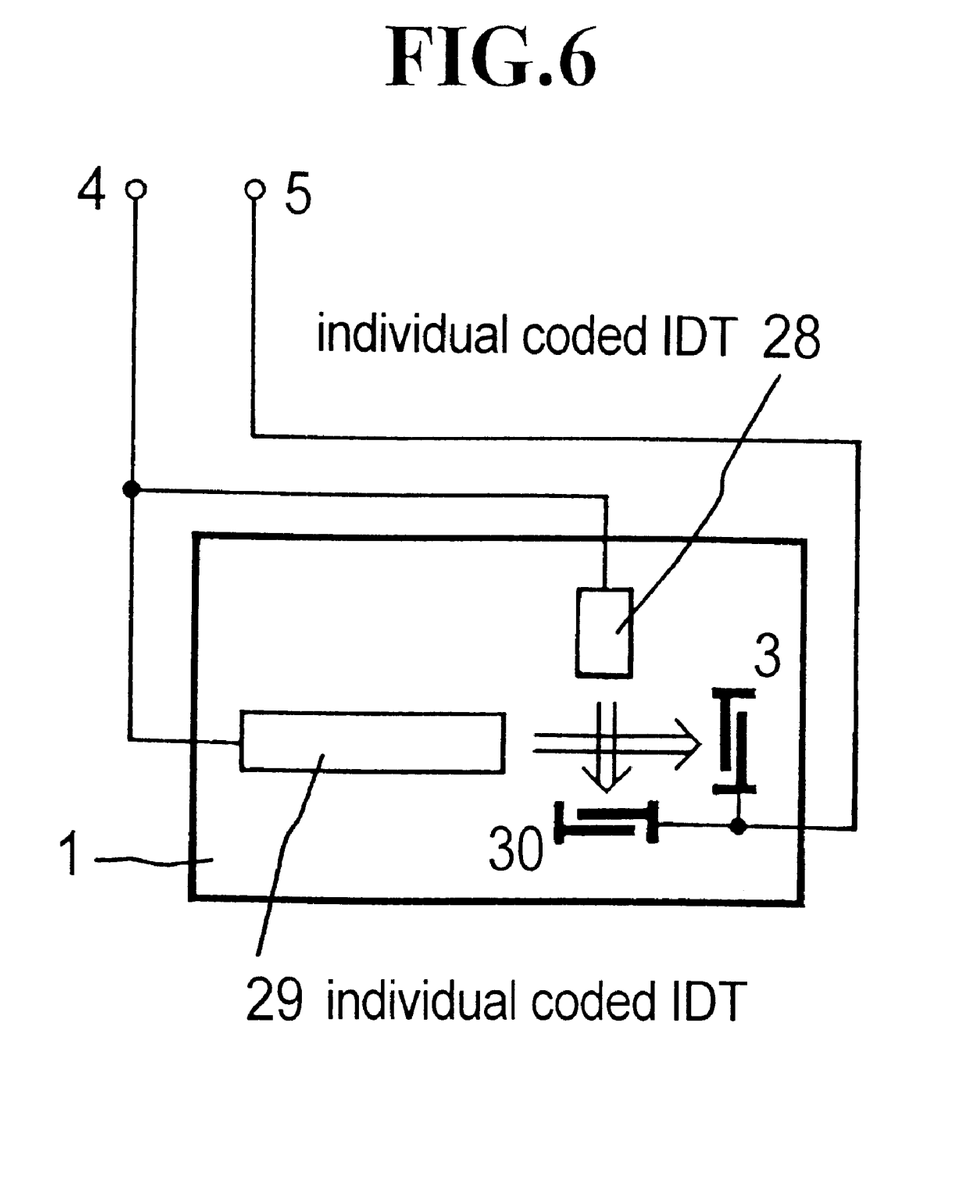
FIG. 6 shows a schematic illustration of a still other identification card in place of the identification card in FIG. 2.

FIG. 6 shows a schematic illustration of a still other identification card in place of the identification card in FIG. 2. The identification card in FIG. 6 comprises individual coded IDT 28, individual coded IDT 29, first intermediary IDT 3 and fourth intermediary IDT 30. Individual coded IDT 28 and individual coded IDT 29 are vertical from each other, and located such that the distance between individual coded IDT 28 and fourth intermediary IDT 30 is shorter than that between individual coded IDT 29 and first intermediary IDT 3. If the pulse generated at bipolar-pulse generator 8 is applied to individual coded IDT 28 and individual coded IDT 29, respectively, first- and second individual SAWs, respectively, are excited on first piezoelectric substrate 1. The first individual SAW is detected at fourth intermediary IDT 30 as a first individual coded burst-signal. The second individual SAW is detected at first intermediary IDT 3 as a second individual coded burst-signal just after the first individual SAW is detected at fourth intermediary IDT 30. The first- and second individual coded burst-signals form a mixed individual coded burst-signal corresponding to the individual coded pattern.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic recognition system on digital communication comprising:
   an identification card consisting of
      a first piezoelectric substrate,
      an individual coded IDT having an individual coded pattern,
      a first intermediary IDT;
   a detail communication device attached to a detail computer and consisting of a second piezoelectric substrate and transmitting- and receiving sections, said transmitting section being composed of
      a bipolar-pulse generator,
      a first coded IDT having a first coded pattern,
      a second coded IDT having a second coded pattern,
      a second intermediary IDT,
      an electrode group consisting of first- and second side IDTs and a central IDT between said first- and second side IDTs,
      a synchronizing device connected between said second intermediary IDT and said first side IDT,
      an envelope detecting device connected with said central IDT a monopolar-pulse generator; and
   a master communication device attached to a master computer and having the same construction as said detail communication device, and consisting of a third piezoelectric substrate and transmitting- and receiving sections, said receiving section being composed of
      a third intermediary IDT,
      a third coded IDT having a third coded pattern,
      a fourth coded IDT having a fourth coded pattern, and
      a detecting device,
         said bipolar-pulse generator generating a pulse while said identification card is set in said detail communication device,
         said individual coded IDT exciting an individual SAW on said first piezoelectric substrate when receiving said pulse,
         said first intermediary IDT detecting an individual coded burst-signal corresponding to said individual coded pattern,
         said first- and second side IDTs receiving said individual coded burst-signal, simultaneously, and exciting first- and second SAWs on said second piezoelectric substrate,
         said central IDT receiving said first- and second SAWs simultaneously,
         said monopolar-pulse generator causing an individual coded digital-signal via said envelope detecting device, and delivering said individual coded digital-signal into a digital network,
         said third intermediary IDT receiving said individual coded digital-signal from said digital network, and exciting a third SAW composed of an individual coded row of burst-wave groups on said third piezoelectric substrate,
         said third- and fourth coded IDTs detecting first- and second decoded pulses, respectively, when each of said burst-wave groups correlates to said third- and fourth coded patterns, respectively,
         said detecting device detecting an output digital-signal, which is based on said first- and second decoded pulses and is equivalent to said individual coded pattern, and recognizing the identification-card singularity from said output digital-signal.

2. An ultrasonic recognition system on digital communication as defined in claim 1, wherein
   said transmitting section of said master communication device delivers a coded request digital-signal asking for password into said digital network just after recognition of said identification-card singularity,
   said receiving section of said detail communication device receives said coded request digital-signal asking for password from said digital network,
   said bipolar-pulse generator generates bipolar pulses (−1 and 1) that form a password digital-signal, except when generating said pulse for said identification card at regular intervals,
   said first- and second coded IDTs excite fourth- and fifth SAWs on said second piezoelectric substrate when receiving said bipolar pulses (−1 and 1), respectively,
   said second intermediary IDT detects a coded burst-signal corresponding to said first- and second coded patterns, respectively,
   said monopolar-pulse generator causes a coded digital-signal from said coded burst-signal, and delivering said coded digital-signal into said digital network, said third intermediary IDT receives said coded digital-signal from said digital network, and said detecting device detects an output digital-signal equivalent to said password digital-signal.

3. An ultrasonic recognition system on digital communication as defined in claim 1, wherein said first-, second-, third-, and fourth coded IDTs consist of at least three interdigital electrode pairs, respectively.

4. An ultrasonic recognition system on digital communication as defined in claim 1, wherein said third- and fourth coded patterns are in reverse to said first- and second coded patterns, respectively.

5. An ultrasonic recognition system on digital communication as defined in claim 1, wherein said individual coded IDT is constructed of multiple times four coded IDTs classified into at most two types that correspond to said first- and second coded IDTs, respectively.

6. An ultrasonic recognition system on digital communication as defined in claim 1 further comprising a bipolar-pulse generator in place of said monopolar-pulse generator.

7. An ultrasonic recognition system on digital communication as defined in claim 1, wherein said individual coded IDT comprises at least two parts that are electrically separated and in uneven parallel with each other, said at least two parts excite at least two individual SAWs, respectively, on said first piezoelectric substrate when receiving said pulse from said bipolar-pulse generator simultaneously, said first intermediary IDT receives said at least two individual SAWs one by one, and detects a mixed individual coded burst-signal corresponding to said individual coded pattern.

8. An ultrasonic recognition system on digital communication as defined in claim 1, wherein said individual coded IDT comprises first- and second parts that are electrically separated and vertical from each other, said identification card further comprises a fourth intermediary IDT, said first- and second parts excite first- and second individual SAWs, respectively, on said first piezoelectric substrate when receiving said pulse from said bipolar-pulse generator simultaneously, said fourth intermediary IDT detects a first individual coded burst-signal corresponding to said first individual SAW, and said first intermediary IDT detects a second individual coded burst-signal corresponding to said second individual SAW just after said fourth intermediary IDT detects said first individual coded burst-signal, said first- and second individual coded burst-signals forming a mixed individual coded burst-signal corresponding to said individual coded pattern.

* * * * *